US012650509B2

(12) United States Patent
     Klügel et al.

(10) Patent No.: US 12,650,509 B2
(45) Date of Patent: Jun. 9, 2026

(54) AIR MOBILITY SYSTEM WITH ENHANCED SITUATIONAL AWARENESS

(71) Applicant: Airbus (S.A.S.), Blagnac Cedex (FR)

(72) Inventors: Markus Klügel, Munich (DE); Nunzio Sciammetta, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 128 days.

(21) Appl. No.: 18/675,242

(22) Filed: May 28, 2024

(65) Prior Publication Data

US 2024/0402330 A1      Dec. 5, 2024

(30) Foreign Application Priority Data

Jun. 2, 2023    (EP) ..................................... 23176947

(51) Int. Cl.
    *G01S 13/87*      (2006.01)
    *G01S 7/00*       (2006.01)
    *G01S 13/933*     (2020.01)
    *G08G 5/20*       (2025.01)

(52) U.S. Cl.
    CPC ............ *G01S 13/876* (2013.01); *G01S 7/003* (2013.01); *G01S 13/933* (2020.01); *G08G 5/20* (2025.01)

(58) Field of Classification Search
    CPC ...... G01S 13/876; G01S 13/933; G01S 7/003; G08G 5/20; G08G 5/727; G08G 5/22; G08G 5/26; G08G 5/723
    See application file for complete search history.

(56) References Cited

U.S. PATENT DOCUMENTS

| | | | |
|---|---|---|---|
| 2018/0246200 A1* | 8/2018 | Goossen | ................. G01S 7/003 |
| 2022/0100209 A1* | 3/2022 | Vallelonga | ............. G05D 1/606 |

FOREIGN PATENT DOCUMENTS

| | | | |
|---|---|---|---|
| CA | 3050426 A1 * | 4/2020 | ........... G01S 13/933 |
| EP | 2980775 A1 | 2/2016 | |

OTHER PUBLICATIONS

European Search Report for Application No. 2231769472 dated Nov. 30, 2023.

* cited by examiner

*Primary Examiner* — Mary Cheung
(74) *Attorney, Agent, or Firm* — KDW Firm PLLC

(57)                    ABSTRACT

An urban air mobility system includes aerial vehicles, a detection platform, and a fusion platform. The aerial vehicles include one cooperative aerial vehicle and one data consuming aerial vehicle. The detection platform detects a position of flight objects and transmits first data indicative of the position of the detected flight objects to the fusion platform. The cooperative aerial vehicle detects a relative position of flight objects in its surroundings and transmits second data indicative of the relative position of detected flight objects to the fusion platform. The fusion platform fuses the first data and the second data and generates an air traffic scenario. The data consuming aerial vehicle and the cooperative aerial vehicle receive the air traffic scenario from the fusion platform.

13 Claims, 2 Drawing Sheets

AIR MOBILITY SYSTEM WITH ENHANCED SITUATIONAL AWARENESS

TECHNICAL FIELD

The description relates to air mobility systems. In particular, the description relates to an urban air mobility system with enhanced situational awareness.

BACKGROUND

With increasing number of aerial vehicles, there is a need for coordinating the air traffic and monitoring the air traffic scenario in a predetermined air space. For example, in the field of Urban Air Mobility and Advanced Air Mobility, a high density of small-to-medium sized aerial vehicles are expected to fly in urban, low-level airspace.

The increase in air traffic requires smart solutions for air traffic management.

SUMMARY

It may be seen as an object to provide an air mobility system with improved autonomous management capabilities to allow for improved air traffic management. This object is solved by the subject matter herein.

An urban air mobility system is disclosed herein. Further developments can be derived from the following description.

According to an aspect, an urban air mobility system comprises a plurality of aerial vehicles, a detection platform, and a fusion platform. The plurality of aerial vehicles includes at least one cooperative aerial vehicle and at least one data consuming aerial vehicle. The detection platform is configured for detecting a position of flight objects in a predefined air space and for transmitting first data indicative of the position of the detected flight objects to the fusion platform. At least one of the at least one cooperative aerial vehicle is configured for detecting a relative position of flight objects in its surroundings, and for transmitting second data indicative of the relative position of detected flight objects to the fusion platform. The fusion platform is configured for fusing the first data and the second data, and for generating an air traffic scenario in the predefined air space based on the first data and the second data. The at least one data consuming aerial vehicle is configured for receiving information indicative of the air traffic scenario from the fusion platform. The at least one cooperative aerial vehicle is configured for receiving information indicative of the air traffic scenario from the fusion platform.

In one example, the at least one or each of the at least one cooperative aerial vehicle is configured for determining its own position. The second data include information relating to the own position of the respective cooperative aerial vehicle. Thus, in addition to the relative position of the flight objects detected in its surroundings, the cooperative aerial vehicle also transmits its own position as part of the second data to the fusion platform.

The urban air mobility system described herein provides an intelligent fusion of position values of flight objects from different sources, i.e., from the detection platform and from the cooperative aerial vehicles. Information provided by the cooperative aerial vehicles as well as information from the detection platform that may have been gained by different sensors are aggregated and used to create improved position estimates of the detected flight objects within a predetermined air space. These improved position estimates are then provided as a service to the cooperative aerial vehicles and to the data consuming aerial vehicles.

The system described herein may utilize position information gained by different, dissimilar approaches, i.e., position information detected by the detection platform and by each cooperative aerial vehicle with different types of sensors. Thus, the accuracy of the position estimate for flight objects in the air space is improved. The approach also allows the detection of non-cooperative aerial vehicles and providing information about the position value of the non-cooperative aerial vehicles to the cooperative aerial vehicles and to the data consuming aerial vehicles. In other words, the fusion platform provides a service with reliable air traffic information to any data consuming aerial vehicle that registers with the fusion platform for receiving respective service data. Furthermore, the urban air mobility system allows to reduce the requirements on the aerial vehicles of the system because not each aerial vehicle needs to be fully equipped with sensor technology as it can rely on the information provided by the other aerial vehicles.

The cooperative aerial vehicle is a vehicle that exchanges data with the fusion platform, i.e., provides/sends data (in particular position data relating to the own position and to the position of detected other flight objects) to the fusion platform and receives data from the fusion platform. For this purpose, the cooperative aerial vehicle may utilize a bidirectional communication link between the cooperative aerial vehicle and the fusion platform. The data consuming aerial vehicle receives position data from the fusion platform but does not provide any position data about detected flight objects to the fusion platform and/or relating to its own position. Thus, the cooperative aerial vehicles contribute to collecting position information relating to the air traffic in the predetermined air space while the data consuming vehicles only receive information relating to the air traffic.

In particular, the urban air mobility system described herein allows for generating an air traffic scenario for a predetermined air space including the cooperative aerial vehicles, the data consuming aerial vehicles, and other non-cooperative flight objects (including aerial vehicles and birds, for example, that do not interact with components of the air mobility system).

The detection platform detects any flight objects in a certain air space, i.e., the cooperative aerial vehicles and the data consuming aerial vehicles and other aerial vehicles or even birds that may be referred to as non-cooperative aerial vehicles. Thus, the detection platform gathers information about all flight objects that can be detected in the predefined air space including aerial vehicles that do not communicate with the fusion platform or any other components of the air mobility system. Thus, the detection platform may collect information about non-cooperative flight objects so that the information about the non-cooperative flight objects can be provided to the cooperative aerial vehicles and to the data consuming aerial vehicles. The detection platform may be a radar system. However, the detection platform may also be part of a mobile communication infrastructure which includes stations that are capable of detecting objects using electromagnetic waves by joint communications and sensing, like envisioned in the communication standard 6G.

The detection platform knowns its own absolute position in a coordinate system, e.g., by using GPS or other GNSS techniques. Furthermore, the detection platform is capable of detecting the relative position and distance to flight objections, i.e., cooperative aerial vehicles, data consuming aerial vehicles, non-cooperative aerial vehicles, and any other flight objects. Based on the known position of the detection platform and the relative position of flight objects with respect to the detection platform, the absolute position of the flight objects can be determined. When the cooperative aerial vehicles provide relative positions of other flight objects with respect to the aerial vehicles, the absolute position of the other flight objects can also be determined by using the absolute position of the detection platform, the relative position of the cooperative aerial vehicles with respect to the detection platform, and the relative position of the other flight object with respect to the cooperative aerial vehicle.

However, the cooperative aerial vehicles may also include a GNSS unit that is capable of determining the absolute position of the cooperative aerial vehicle. Thus, the absolute position of flight objects detected by the cooperative aerial vehicle can also be determined based on the absolute position detected by the cooperative aerial vehicle and the relative position of the flight object with respect to the cooperative aerial vehicle.

The air traffic scenario includes information about the position of the cooperative aerial vehicles and other detected aerial vehicles. Thus, the air traffic scenario gives a good overview of the air traffic in the predefined air space.

The fusion platform receives information (from the cooperative aerial vehicles and/or from the detection platform) defining the position values of different aerial vehicles and fuses the position values to generate an air traffic scenario. The position values may include a time stamp and/or an uncertainty information for each position value. Based on the provided information, the fusion platform may determine a movement trajectory and/or a speed vector of each object in the air space and provide the movement trajectory and/or the speed vector of each object to the cooperative aerial vehicles and the data consuming aerial vehicle.

The cooperative aerial vehicles may comprise a position determining device that interoperates with a navigation satellite system like Global Positioning System or other Global Navigation Satellite Systems to determine their respective own positions. Furthermore, the cooperative aerial vehicles include a detection unit that is configured to determine a relative position to another flight object. With the absolute position of the cooperative aerial vehicle and the relative position of the other flight object, the fusion platform can determine the absolute position of the other flight object.

The fusion platform distributes the generated air traffic scenario to any aerial vehicle of the air mobility system that registers for receiving the information. Thus, any aerial vehicle of the air mobility system may have up-to-date information describing the air traffic scenario even if one of the aerial vehicles has no detection system aboard or if a flight object is out of reach of the detection system of an aerial vehicle.

In one embodiment, the at least one cooperative aerial vehicle comprises a detection unit for detecting the relative position of flight objects in its surroundings, and the detection unit comprises at least one sensor that is selected from the group consisting of a radar, a lidar, and a camera.

The detection unit is located on or at the cooperative aerial vehicle and is configured to sense the environment and the surroundings of the aerial vehicle to detect any flight objects in the surroundings thereof. The detection unit may include one or more sensors. The sensors may operate in different spectral ranges, i.e., with radio waves, laser, visible light, infrared light, or even audio signals, to detect flight objects and their characteristics in different spectral ranges.

In another embodiment, the detection unit comprises at least two sensors, each of which is selected from the group consisting of a radar, a lidar, and a camera.

Preferably, the detection unit comprises not only one but two or more sensors so that the position of a flight object can be determined based on measurements of different types of sensors.

In another embodiment, the at least one cooperative aerial vehicle comprises a fusion unit that is connected to the detection unit. The fusion unit is configured for fusing the relative position of flight objects detected by the at least two sensors. The fusion unit is configured for transmitting the fused relative positions of flight objects to the fusion platform.

The cooperative aerial vehicle may transmit the position values of one or more sensors directly to the fusion platform. However, in this embodiment, when the cooperative aerial vehicle comprises two or more sensors, the cooperative aerial vehicle may also comprise a fusion unit that fuses the position values of flight objects detected by the two or more sensors and transmit the fused position values to the fusion platform.

In another embodiment, the first data includes an indication of a detection accuracy relating to the position of the detected flight objects of the first data, and/or the second data includes an indication of a detection accuracy relating to the own position and the relative position of the detected flight objects of the second data.

Thus, the respective position values may be attributed by the detection accuracy so that a receiver of the position values may also refer to the detection accuracy.

In another embodiment, at least one of the plurality of aerial vehicles is configured for registering with the fusion platform for receiving updates of the air traffic scenario in the predefined air space.

Thus, in this embodiment, the fusion platform sends information about the generated air traffic scenario only to those aerial vehicles which register with the fusion platform for receiving the air traffic scenario. Alternatively, it is conceivable that the fusion platform broadcasts the information about the air traffic scenario on a known channel/frequency and any aerial vehicle can receive and use the information.

In another embodiment, the at least one of the plurality of aerial vehicles is configured for registering with the fusion platform for receiving event-based updates of the air traffic scenario in the predefined air space.

In this embodiment, the updates of the air traffic scenario are sent to the respective aerial vehicle in an event-based manner, i.e., when a predetermined condition is met. This predetermined condition may be individually defined by different aerial vehicles.

In another embodiment, the event-based updates are initiated when a predetermined criterion is met. The predetermined criterion is met when a flight object is located within a certain range of the at least one of the plurality of aerial vehicles, and/or when a flight object moves along a trajectory that intersects a movement trajectory of the at least one of the plurality of aerial vehicles, and/or when a flight object approaches the at least one of the plurality of aerial vehicles with a speed higher than a predetermined threshold values, and/or when the first data and/or the second data meet a predetermined accuracy requirement, all those first and second data that meet the predetermined accuracy requirement are sent to the at least one of the plurality of aerial vehicles.

In another embodiment, the at least one of the plurality of aerial vehicles is configured for registering with the fusion platform for receiving regular updates of the air traffic scenario in the predefined air space.

In this embodiment, the updates are sent within same or different time periods by the fusion platform to the aerial vehicles that are registered for updates.

In another embodiment, the detection platform is a radar system, for example a ground-based radar system.

The radar system may be located on the surface of the earth in a stationary unit, like a ground station, or mobile unit, like a vehicle, e.g., land vehicle or watercraft. This radar system is configured to detect flight objects and to send the position information (including time stamp, and/or characteristics, and/or speed vector, etc.) of detected flight objects to the fusion platform. Thus, position information about flight objects gathered by the detection platform are provided, via the fusion platform, to the aerial vehicles of the urban air mobility system.

In another embodiment, the fusion platform is a ground-based system.

The fusion platform may be located on the surface of the earth in a stationary or mobile unit, like a vehicle, e.g., land vehicle or watercraft.

Alternatively, it is conceivable that the fusion platform is located in one of the plurality of aerial vehicles and receives data from the other aerial vehicles of the plurality of aerial vehicles and/or sends data to those aerial vehicles. In that case, the fusion platform can be configured to send fused data to another external entity which processes the data in order to provide an overview of the air traffic scenario.

However, the fusion platform may also be a distributed system comprising multiple units that are spatially separated from one another and interconnected via communication links. Some of the units of the fusion platform may be ground based and other may be located aboard one or more of the aerial vehicles of the air mobility system. For example, each cooperative aerial vehicle comprises one or more sensors and the cooperative aerial vehicles exchange data detected by their respective sensors with each other via a communication link that is established between the cooperative aerial vehicles. The data can be exchanged as raw sensor data or after performing a data processing step by the respective local entity of the fusion platform.

In another embodiment, the plurality of aerial vehicles includes at least one of a helicopter, a vertical take-off and landing vehicle (VTOL), electric VTOL, a drone.

Thus, the air mobility system described herein is particularly beneficial for use in urban areas with a high density of small-to-medium sized manned or unmanned, remotely controlled or autonomous or partly autonomous aerial vehicles that fly in urban, low-level air space.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
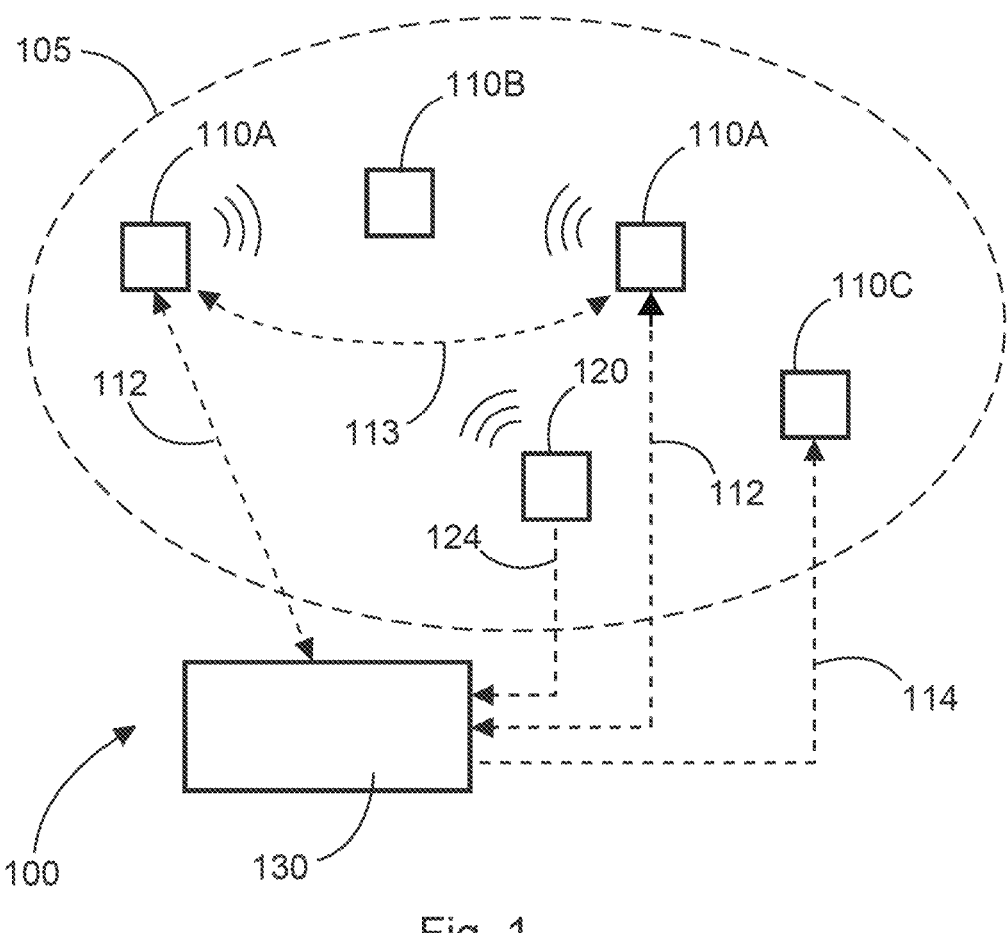
FIG. 1 is a schematic representation of an urban air mobility system.

The following detailed description is merely exemplary in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows an air mobility system 100. The air mobility system 100 comprises multiple aerial vehicles 110, a detection platform 120, and a fusion platform 130. The aerial vehicles 110 include multiple cooperative aerial vehicles 110A, a non-cooperative aerial vehicle 110B, and a data consuming aerial vehicle 110C.

The cooperative aerial vehicles 110A are equipped with a detection unit 116 (see FIG. 2) and are able to detect other aerial vehicles like the non-cooperative aerial vehicle 110B. The cooperative aerial vehicles 110A exchange data relating to the detected aerial vehicles with the fusion platform 130 via a respective bidirectional data transmission 112. The cooperative aerial vehicles 110A also receive data relating to aerial vehicles detected by other cooperative aerial vehicles 110B from the fusion platform 130.

The detection platform 120 also scans the air space 105 for aerial vehicles. In the example of FIG. 1, the non-cooperative aerial vehicle 110B is detected by the two cooperative aerial vehicles 110A and by the detection platform 120. The cooperative aerial vehicles 110A and the detection platform 120 transmit data about the non-cooperative aerial vehicle 110B to the fusion platform 130 via the data transmission links 112, 124. The data transmission link 124 may be referred to as a unidirectional data transmission link. However, this describes the flow of information about the detected aerial vehicles and means that the information about the detected aerial vehicles is transmitted in one direction only from the detection platform 120 to the fusion platform 130. The fusion platform 130 may transmit control commands to the detection platform 120 in order to control the detection platform so as to scan a predetermined region within the air space 105.

Sensor data detected by the cooperative aerial vehicles 110A can be directly exchanged between the cooperative aerial vehicles 110A via a communication link 113, which typically is a radio or optical link. The sensor data exchanged between the cooperative aerial vehicles may be processed locally by the receiving aerial vehicle, in particular when the aerial vehicles include a fusion unit 119 (see FIG. 3) that executes data fusion operations.

Of course, the detection platform 130 detects any flight objects in the air space 105, i.e., not only the non-cooperative aerial vehicles 110B, but also the cooperative aerial vehicles 110A. Thus, multiple sources of position data for the flight objects in the air space are used to provide redundancy of position data. Intrinsic redundancy may be provided by relying on position data of multiple independent sources like the detection platform 130 and one or more cooperative aerial vehicles 110A, wherein the cooperative aerial vehicles may also be different types of vehicles with different sensors, like a drone with a camera or a helicopter with a lidar, radar, etc. The cooperative aerial vehicles 110A detect their own position via GPS or any other GNSS. The own position is transmitted to the fusion platform 130. Furthermore, the cooperative aerial vehicles 110A transmit relative position values of other detected flight objects and transmit those relative position values to the fusion platform 130 which determines absolute position values for the flight objects based on the own position value of the cooperative aerial vehicle and the relative position value of the detected flight objects.

The position values of flight objects within the air space 105 may be provided to data consuming aerial vehicles 110C via a data transmission link 114. For example, the data consuming aerial vehicle 110C may be a vehicle that passes the air space 105 and receives information about flight objects within the air space 105. Typically, the data consuming aerial vehicle 110C does not provide own position information to the fusion platform but only requests position information about other flight objects.

In the context of this description, position data or position values of aerial vehicles (AVs) refers to any data that identifies the position and/or movement (heading/roll/pitch/yaw) of a flight object, especially of an aerial vehicle, and is required in airspace to gain situational awareness. The air mobility system 100 implements the function of a position data fusion system which is a technical system comprising three components: (a) a set of position detection systems (DET) as part of the cooperative aerial vehicles 110A and the detection platform 120; (b) a data fusion platform (FP) 130; and (c) a set of position data consumers (CON) 110C.

The detection systems (DET) are systems that have the goal of detecting the position and/or movement of one or more Avs and flight objects. As such, their function is that they perform a technical action and provide an estimate about the existence and absolute or relative position/movement of an AV. The detection systems may be installed on-board of an AV (the cooperative aerial vehicles 110A) or as an external system (the detection platform 120) on the ground, in the air (aboard one of the cooperative aerial vehicles 110A), or in space. Examples may be a set of ground radars, GPS/GNSS receivers for self-positioning, but also generally any radar/lidar device, or any other suitable detection technology, e.g., based on radio characteristics (as targeted in 5G or 6G mobile communication standards, for example), machine learning, etc. In addition to the position estimate of an AV, the detection system may also provide data about the detection accuracy, e.g., an uncertainty radius or ellipse.

The data fusion platform 130 (FP) is a data platform that takes the data of a set of detection systems as an input and creates a best estimate about their true position, including also an estimate of detection accuracy. Technically, the fusion platform 130 comprises a set of computing devices. Part of these devices may be located centrally in a single data center or distributed in multiple data centers, part of the devices may also be located on the AVs. Different parts of the data fusion platform 130 may also exchange data with each other via a communication network.

The position data consumers (CON, the data consuming aerial vehicle 110C) are devices that receive position data from the fusion platform 130. They may register at the platform for regular updates at different frequencies or for event-based updates, e.g., if the fusion system estimates that another AV is within a certain range of another one.

As described above, FIG. 1 shows an example of the air mobility system 100. As depicted, two cooperative air vehicles 110A mutually advertise their positions which they determined via GNSS, while at the same time they detect the presence of a non-cooperative platform 110B. A ground radar 120 also estimates the position of all three Avs 110A, 110B. All detectors send data to the fusion platform 130, which creates best estimates of the position values of all three air vehicles 110A 110B, using the advertised positions, as well as detection data. Both cooperative platforms are also position data consumers that receive the best estimate from the fusion platform 130. Finally, there is another airspace user 110C that does not have detection capabilities but receives the position estimates from the fusion platform.

The position values and headings of an aircraft are represented in a predefined format. Examples are three dimensional tuples that represent the (x, y) offset and height relative to a known position. The heading can equivalently be represented by a three-dimensional speed vector. Each of the vectors could be complemented with a confidence estimation, e.g., the 95% confidence interval or standard deviation in (x, y, z).

Figure 2:
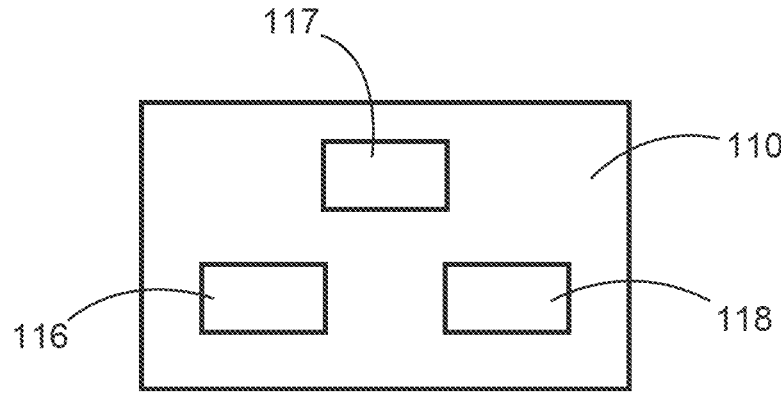
FIG. 2 is a schematic representation of an aerial vehicle.

FIG. 2 shows an aerial vehicle 110, in particular a cooperative aerial vehicle. The cooperative aerial vehicle comprises a detection unit 116 for detecting other flight objects as referred to above, a position determining unit 117 for determining the own position of the aerial vehicle, and a processing unit 118 (a data consumer) for processing data like received position data information relating to other aerial vehicles.

A cooperative aerial vehicle may act as a detection system, as a data consumer, or both. When an aerial vehicle acts as a detection system, it comprises the detection unit 116 and the position determining unit 117, when it acts as a data consumer, it comprises the processing unit 118. However, an aerial vehicle may act as a detector system and as a data consumer.

Figure 3:
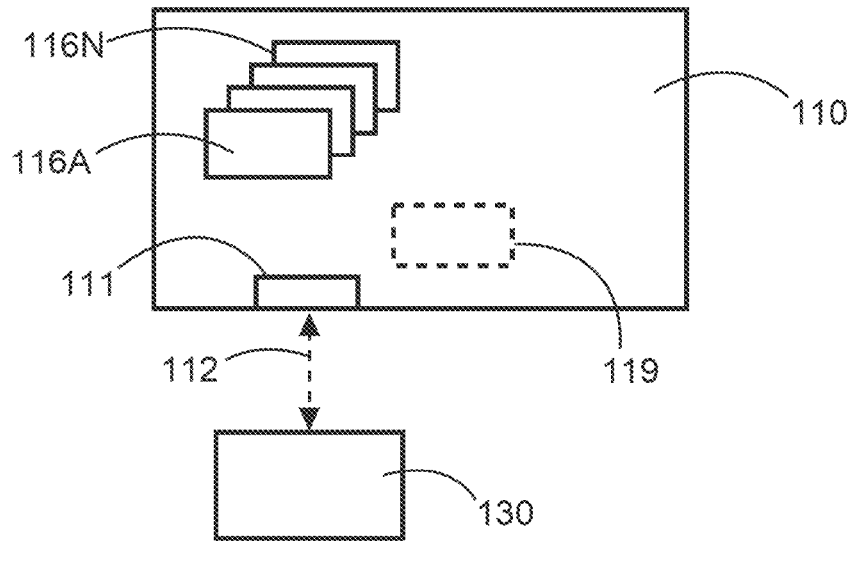
FIG. 3 is another schematic representation of an aerial vehicle.

FIG. 3 shows an aerial vehicle 110 with multiple detection units 116A . . . 116N, a fusion unit 119, and an antenna 111. The aerial vehicle 110 of FIG. 3 may also comprise a position determining unit and a processing unit as shown in FIG. 2. The aerial vehicle 110 comprises multiple detection units which preferably are of different type and operate in different spectral ranges for reasons of redundancy. The position values of flight objects detected by the multiple detection units 116 may be transmitted to the fusion platform 130 via the transmission link 112. Alternatively, the position values of flight objects detected by the multiple detection units 116 may be fused locally in the aerial vehicle 110 by the fusion unit 119 and the result of this fusion operation is then transmitted to the fusion platform 130 via the antenna 119 and the data transmission link 112.

Figure 4:
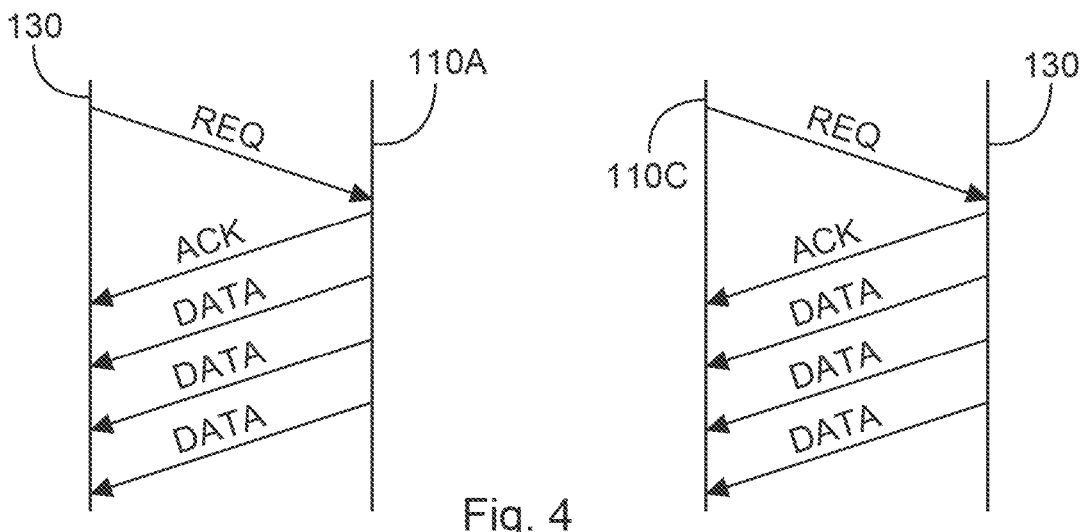
FIG. 4 is a schematic representation of a message exchange for a regular update of information about an air traffic scenario.
Figure 5:
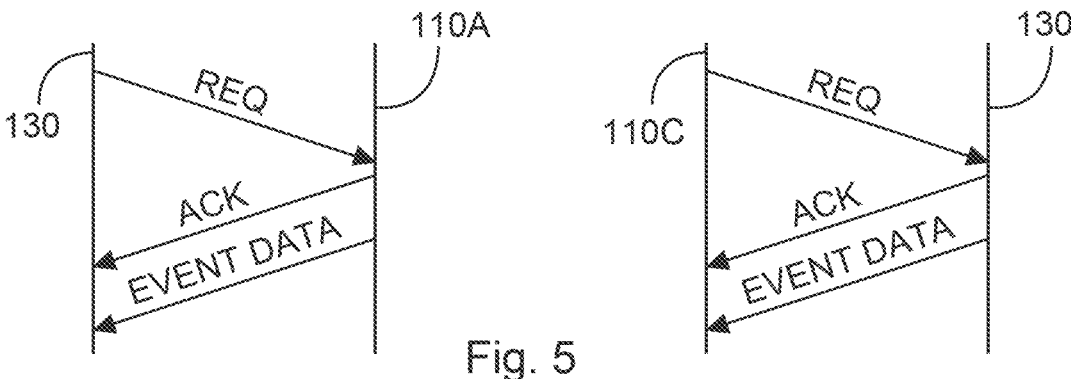
FIG. 5 is a schematic representation of a message exchange for an event-based update of information about an air traffic scenario.

FIGS. 4 and 5 show different approaches for data exchange approaches between the fusion platform 130 and data-producing aerial vehicles which typically are cooperative aerial vehicles 110A with a detector, and data consuming aerial vehicles 110C, respectively. FIG. 4 shows an approach of periodic position information updates and FIG. 5 shows an approach of event-based position information updates.

In FIG. 4, according to the left hand side communication structure, the fusion platform 130 requests (REQ) position information from the cooperative aerial vehicle 110A, which acknowledges (ACK) the request and sends position values (DATA) to the fusion platform. According to the right hand side communication structure, the data consuming aerial vehicle 110A requests (REQ) position information about aerial vehicles from the fusion platform 130. The fusion platform 130 acknowledges (ACK) the request and sends position values (DATA) to the data consuming aerial vehicle 110C.

In a periodic data stream shown in FIG. 4, the aerial vehicles 110A, 110C and the fusion platform 130 may first negotiate the stream parameters, i.e., which data to report at which frequency. For example, the aerial vehicle could request (REQ) to get reports for all other vehicles that are within a specified distance of itself (data from the fusion platform to the aerial vehicle). On the reverse path, the fusion platform 130 could request all measured data from the aerial vehicle that matches a minimum accuracy requirement (data from the aerial vehicle to the fusion platform). After negotiation, the fusion platform 130 sends the data with the specified parameters to the aerial vehicle or vice versa.

For event-based data exchange, as shown in FIG. 5, data is reported only when a predefined event occurs. This could be, e.g., the event that another aerial vehicle is approaching with a speed higher than a predefined threshold.

While at least one example embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure herein in any way. Rather, the foregoing detailed description will provide those skilled in the art with a convenient road map for implementing an exemplary embodiment of the disclosure herein. It will be understood that various changes may be made in the function and arrangement of elements described in an exemplary embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

LIST OF REFERENCE SIGNS

110 aerial vehicle
110A cooperative aerial vehicle
110B non-cooperative aerial vehicle
110C data consuming aerial vehicle
111 antenna
112 data transmission link
113 communication link
114 data transmission link
116 detection unit
117 position determining unit
118 processing unit
119 fusion unit
120 detection platform
124 data transmission link
130 fusion platform

The invention claimed is:
1. An urban air mobility system, comprising:
a plurality of aerial vehicles;
a detection platform;
a fusion platform;
wherein the plurality of aerial vehicles includes at least one cooperative aerial vehicle and at least one data consuming aerial vehicle;
wherein the detection platform is configured for detecting a position of flight objects in a predefined air space and for transmitting first data indicative of the position of the detected flight objects to the fusion platform;
wherein at least one of the at least one cooperative aerial vehicle is configured for detecting a relative position of flight objects in its surroundings, and for transmitting second data indicative of the relative position of detected flight objects to the fusion platform;
wherein the fusion platform is configured to:
send control commands to the detection platform to cause the detection platform to scan the predefined airspace;
fuse the first data and the second data; and
generate an air traffic scenario in the predefined air space based on the first data and the second data;
wherein the at least one data consuming aerial vehicle is configured for receiving information indicative of the air traffic scenario from the fusion platform; and
wherein the at least one cooperative aerial vehicle is configured for receiving information indicative of the air traffic scenario from the fusion platform.
2. The urban air mobility system of claim 1,
wherein the at least one cooperative aerial vehicle comprises a detection unit for detecting the relative position of flight objects in its surroundings; and
wherein the detection unit comprises at least one sensor that is selected from the group consisting of radar, lidar, and a camera.
3. The urban air mobility system of claim 1,
wherein the detection unit comprises at least two sensors, each of which is selected from the group consisting of radar, lidar, and a camera.
4. The urban air mobility system of claim 3,
wherein the at least one cooperative aerial vehicle comprises a fusion unit that is connected to the detection unit;
wherein the fusion unit is configured for fusing the relative position of flight objects detected by the at least two sensors; and
wherein the fusion unit is configured for transmitting the fused relative positions of flight objects to the fusion platform.
5. The urban air mobility system of claim 1,
wherein the first data includes an indication of a detection accuracy relating to the position of the detected flight objects of the first data; and/or
wherein the second data includes an indication of a detection accuracy relating to an own position and the relative position of the detected flight objects of the second data.
6. The urban air mobility system of claim 1,
wherein at least one of the plurality of aerial vehicles is configured for registering with the fusion platform for receiving updates of the air traffic scenario in the predefined air space.
7. The urban air mobility system of claim 6,
wherein the at least one of the plurality of aerial vehicles is configured for registering with the fusion platform for receiving event-based updates of the air traffic scenario in the predefined air space.
8. The urban air mobility system of claim 7,
wherein the event-based updates are initiated when a predetermined criterion is met; and wherein the predetermined criterion is met when a flight object is located within a certain range of the at least one of the plurality of aerial vehicles, and/or when a flight object moves along a trajectory that intersects a movement trajectory of the at least one of the plurality of aerial vehicles, and/or when a flight object approaches the at least one of the plurality of aerial vehicles with a speed higher than a predetermined threshold values, and/or when the first data and/or the second data meet a predetermined accuracy require- ment, all of the first and second data that meet the predetermined accuracy requirement are sent to the at least one of the plurality of aerial vehicles.

9. The urban air mobility system of claim 6, wherein the at least one of the plurality of aerial vehicles is configured for registering with the fusion platform for receiving regular updates of the air traffic scenario in the predefined air space.

10. The urban air mobility system of claim 1 wherein the detection platform is a radar system.

11. The urban air mobility system of claim 10, wherein the detection platform is a ground-based radar system.

12. The urban air mobility system of claim 1, wherein the fusion platform is a ground-based system.

13. The urban air mobility system of claim 1, wherein the plurality of aerial vehicles includes at least one of a heli- copter, a vertical take-off and landing vehicle, a drone.

* * * * *